US009369742B2

(12) United States Patent
Karacali-Akyamac (10) Patent No.: US 9,369,742 B2
(45) Date of Patent: *Jun. 14, 2016

(54) SYSTEM AND METHOD TO ESTIMATE END-TO-END VIDEO FRAME DELAYS (71) Applicant: Avaya Inc., Basking Ridge, NJ (US)

(72) Inventor: Bengi Karacali-Akyamac, Bridgewater, NJ (US)

(73) Assignee: Avaya Inc., Basking Ridge, NJ (US)

( * ) Notice: Subject to any disclaimer, the term of this patent is extended or adjusted under 35 U.S.C. 154(b) by 620 days.

This patent is subject to a terminal disclaimer.

(21) Appl. No.: 13/706,383

(22) Filed: Dec. 6, 2012

(65) Prior Publication Data

US 2014/0165085 A1 Jun. 12, 2014

(51) Int. Cl.
H04N 21/234 (2011.01)
H04N 21/439 (2011.01)
H04N 21/4788 (2011.01)
H04N 21/647 (2011.01)
H04N 21/63 (2011.01)

(52) U.S. Cl.
CPC ..... H04N 21/23418 (2013.01); H04N 21/4394 (2013.01); H04N 21/4788 (2013.01); H04N 21/632 (2013.01); H04N 21/64738 (2013.01)

(58) Field of Classification Search
CPC . G06K 9/00228; G06K 9/036; H04N 17/004; H04N 21/23418; H04N 21/24; H04N 21/64738; H04N 21/4394; H04N 21/4788; H04N 21/632
See application file for complete search history.

(56) References Cited

U.S. PATENT DOCUMENTS

| 4,183,013 A | 1/1980 | Agrawala et al. |
| 4,468,704 A | 8/1984 | Stoffel et al. |
| 4,703,512 A | 10/1987 | Saka et al. |
| 4,742,552 A | 5/1988 | Andrews |
| 4,783,829 A | 11/1988 | Miyakawa et al. |
| 4,868,871 A | 9/1989 | Watson, III |
| 4,937,878 A | 6/1990 | Lo et al. |
| 4,991,009 A | 2/1991 | Suzuki et al. |
| 4,996,594 A | 2/1991 | Murayama |
| 5,034,986 A | 7/1991 | Karmann et al. |
| 5,059,796 A | 10/1991 | Nakamura |
| 5,109,425 A | 4/1992 | Lawton |
| 5,243,418 A | 9/1993 | Kuno et al. |

(Continued)

OTHER PUBLICATIONS

Caspi et al."Feature-Based Sequence-to-Sequence Matching," from Vision and Modelling of Dynamic Scenes Workshop, Copenhagen, Denmark, Jun. 2002, 4 pages.

(Continued)

Primary Examiner — Hai V Tran (57) ABSTRACT

System and method to calculate video frame delay in a video stream received by a telecommunications endpoint, the method including: locating reference features characteristic of content in the received video stream; calculating, by use of a processor, reduced reference features from the located reference features; receiving reduced reference features of a transmitted video stream, the transmitted video stream corresponding to the received video stream; calculating, by use of a processor, a received trajectory of the reduced reference features from the received video stream; calculating, by use of a processor, a transmitted trajectory of the reduced reference features from the transmitted video stream; and calculating, by use of a processor, video frame delay as a time shift between the received trajectory and the transmitted trajectory.

18 Claims, 6 Drawing Sheets

(56) References Cited

U.S. PATENT DOCUMENTS

| | | | |
|---|---|---|---|
| 5,285,273 | A | 2/1994 | James et al. |
| 5,341,142 | A | 8/1994 | Reis et al. |
| 5,420,638 | A | 5/1995 | Riglet et al. |
| 5,473,378 | A | 12/1995 | Tamitani |
| 5,631,975 | A | 5/1997 | Riglet et al. |
| 6,035,067 | A | 3/2000 | Ponticos |
| 7,668,397 | B2* | 2/2010 | Le Dinh et al. ............... 382/275 |
| 7,705,881 | B2* | 4/2010 | Okamoto et al. ............. 348/180 |
| 8,508,597 | B2* | 8/2013 | Bourret et al. ................ 348/192 |
| 8,520,075 | B2* | 8/2013 | Bhagavathy et al. ......... 348/180 |

OTHER PUBLICATIONS

Liu et al., "Real-time Video Quality Monitoring for Mobile Devices," 44th Annual Conference on Information Sciences and Systems (CISS), May 13, 2010, Dialogic Research, Inc., Eatontown, NJ, 6 pages.

Yan et al., "Video synchronization via space-time interest point distribution," In Proceedings of Advanced Concepts for Intelligent Vision Systems, 2004, 5 pages.

"nGenius Voice | Video Manager," NetScout Systems, Inc., California, http://www.netscout.com/products/enterprise/nSAS/ngenius_analysis/Pages/nGenius_VoicnGenius Voice | Voice Manager, Retrieved Aug. 17, 2012, 2 pages.

Pik et al., "A Novel Scheme for Hybrid Digital Video Watermarking: Approach, Evaluation and Experimentation," submitted to IEEE Transactions on Circuits and Systems for Video Technology (2005), IEEE Transactions on Circuits and Systems for Video Technology, Dec. 2005, pp. 1638-1649, vol. 15, Issue 12, 12 pages.

Suresh et al., "Real-Time Prototype of a Zero-Reference Video Quality Algorithm," International Conference on Consumer Electronics, ICCE 2008, Digest of Technical Papers, Aug. 5, 2008, 2 pages.

Whitehead et al., "Temporal Synchronization of Video Sequences in Theory and in Practice," Proceedings of the IEEE Workshop on Motion and Video Computing (WACV/MOTION'05), Jan. 5-7, 2005, 6 pages.

"Video Quality Measurement Algorithms: Scaling IP Video Services for the Real World," Brix Networks Inc, Chelmsford, MA, White Paper, 2006, 7 pages.

\* cited by examiner

SYSTEM AND METHOD TO ESTIMATE END-TO-END VIDEO FRAME DELAYS

BACKGROUND

1. Field of the Invention

Embodiments of the present invention generally relate to detection of degraded quality of a video transmission, and, in particular, to a system and method for using face detection to detect and correct for excessive end-to-end video frame delays in order to improve video quality.

2. Description of Related Art

Often during a live interview on TV, an interviewer in a studio may be talking with an interviewee at a remote location. There may be an appreciable delay for the video and audio signal going back and forth. This tends to create ambiguous verbal cues as to whether one person has stopped talking and is expecting the other person to start talking, and so forth. As a result, the interview and interviewee may begin talking over one another, and then they both stop and wait for the other person to continue talking, and so forth. This scenario is one manifestation of excessive end-to-end video frame delays. In another manifestation, there may be a relatively high differential delay between the audio and video portions of an interview, such that there is a noticeable and annoying timing mismatch between spoken words that are heard and video of a speaker speaking the spoken words.

Improving and maintaining high video quality during adverse network conditions is important for wide deployments of video over IP networks that inherently lack end-to-end quality of service ("QoS") guarantees. Application-layer quality assurance is typically enhanced by monitoring video frame delay in real-time, detecting degradation, and taking appropriate action when the video frame delay increases unacceptably. A key step in the process, detection of high video frame delay in real-time, requires light-weight video metrics that can be computed with low computational overheads and communicated to the sending side with small transmission overheads.

End-to-end frame delay is an important metric impacting video Quality of Experience ("QoE"). End-to-end frame delay is defined as the difference between the time of capture of a frame at the source and the time the frame is displayed at the destination. High frame delays can render a video conversation useless and can contribute to lip-synching problems. As the audio and video streams in video conferencing and video phones typically take different paths, understanding the end-to-end frame delay is important in QoE monitoring and potentially debugging.

When a video system is operational, frame delays can be computed by inserting a watermark in parts of the image not visible to the user. Watermarking involves embedding timing information into video streams images such that the embedded timing information can be used to identify matching frames between the sent and received streams. Frames with the same watermark values on the sent and received sides of a video stream are determined and their timing information are compared to compute the end-to-end frame delay. The clocks of the machines computing the metric need to be synchronized. A disadvantage is that watermarks may become distorted or obliterated during transcoding operations.

Frame delay may be computed by synchronizing sent and received frames, and then using the timing information of synchronized frames to compute the frame delay. Frame synchronization typically relies on image processing based techniques and is time consuming especially in the presence of frame losses, transcoding, changes in frame rates and resolution. Hence computing frame delay by relying on frame synchronization is not suitable for real time operations.

End-to-end frame delay measurements, while important for QoE, are typically not measured or reported to the users during a video conference or a video call. Therefore, a need exists to provide a process to measure delays between a sent and received video stream, in order to provide end-to-end frame delay measurements, and ultimately improved customer satisfaction.

SUMMARY

Embodiments in accordance with the present invention address estimating end-to-end frame delay for video streams subjected to transcoding/mixing in video conferencing applications. The technique is computationally lightweight and agnostic to the used video decoder, frame size, frame rate, and bit rate.

Embodiments of the present invention generally relate to video impairments, and, in particular, to a system and method for using face detection in estimating frame delay, thereby exploiting characteristics of video content in applications such as video conferencing, which often includes relatively few speakers and a relatively low amount of motion. In such applications, motion is concentrated mainly around the face, making the face an area of interest. Loss of synchronization in facial regions is more likely to be noticed by subjective users. Embodiments in accordance with the present invention use a novel frame delay estimation technique that focuses on a box surrounding the faces. Embodiments in accordance with the present invention may measure how trajectories of a characteristic of the box differ between sent and received frames under network degradation.

The difference in characteristic of the box between sent and received frames is a lightweight indicator (i.e., an indicator that is not resource intensive to compute), in contrast to a comparison of the contents of the boxes, which is relatively more resource intensive to compute. Resources may include processing time, memory usage, transmission-related costs, and so forth. Tracking the speed of facial movement based on the box location changes should detect problems with the quality of service that are severe enough to warrant corrective action. For example, if the difference in box locations shows that a face has been found in the wrong place, by more than a de minimus amount, then the difference is an indication of a severe problem.

Embodiments in accordance with the present invention may provide a method to detect video frame delay in a video stream received by a telecommunications endpoint, the method including: locating reference features characteristic of content in the received video stream; calculating, by use of a processor, reduced reference features from the located reference features; receiving reduced reference features of a transmitted video stream, the transmitted video stream corresponding to the received video stream; calculating, by use of a processor, a received trajectory of the reduced reference features from the received video stream; calculating, by use of a processor, a transmitted trajectory of the reduced reference features from the transmitted video stream; and calculating, by use of a processor, video frame delay as a time shift between the received trajectory and the transmitted trajectory.

Embodiments in accordance with the present invention may provide a system to detect video frame delay in a video stream received by a telecommunications endpoint, the system including: a location module configured to locate reference features characteristic of content in the received video stream; a processor configured to calculate reduced reference features from the located reference features; a receiver configured to receive reduced reference features of a transmitted video stream, the transmitted video stream corresponding to the received video stream; a processor configured to calculate a distance between the reduced reference features in the received video stream and the reduced reference features of the transmitted video stream; a processor configured to calculate a received trajectory of the reduced reference features from the received video stream; a processor configured to calculate a transmitted trajectory of the reduced reference features from the transmitted video stream; and a processor configured to calculate video frame delay as a time shift between the received trajectory and the transmitted trajectory.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database (s), the disclosure is not limited to use with any particular type of communication system or configuration of system elements. Those skilled in the art will recognize that the disclosed techniques may be used in any communication application in which it is desirable to utilize computationally-light methods to detect video degradations.

The exemplary systems and methods of this disclosure will also be described in relation to video conferencing software, modules, and associated video conferencing hardware. However, to avoid unnecessarily obscuring the present disclosure, the following description omits well-known structures, components and devices that may be shown in block diagram form, are well known, or are otherwise summarized.

Embodiments in accordance with the present invention address the problem of detecting video frame delay degradation in real-time and in-service, to ensure end-to-end video quality in times of adverse network conditions by taking appropriate counter-measures. Such quality of service ("QoS") assurance mechanism requires light-weight video quality metrics that can be implemented with low computational and communication overheads. Embodiments herein describe a novel video quality metric for video conferencing-type applications that is accurate and light-weight for real-time operations.

Ensuring end-to-end video frame delay may require the monitoring of quality in real-time and in-service, and taking counter-measures in times of adverse network conditions. Such application-layer QoS assurance mechanisms may require light-weight video metrics that can be implemented with low computational and communication overheads.

Embodiments in accordance with the present invention provide a novel video metric for video conferencing-type applications that better reflects user opinion at least as to quality, and is light-weight for real-time operations. Embodiments in accordance with the present invention may operate by exploiting the characteristics of the video content in such applications, i.e. few speakers with limited motion.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

The terms "switch," "server," "contact center server," or "contact center computer server" as used herein should be understood to include a Private Branch Exchange ("PBX"), an ACD, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

Figure 1:
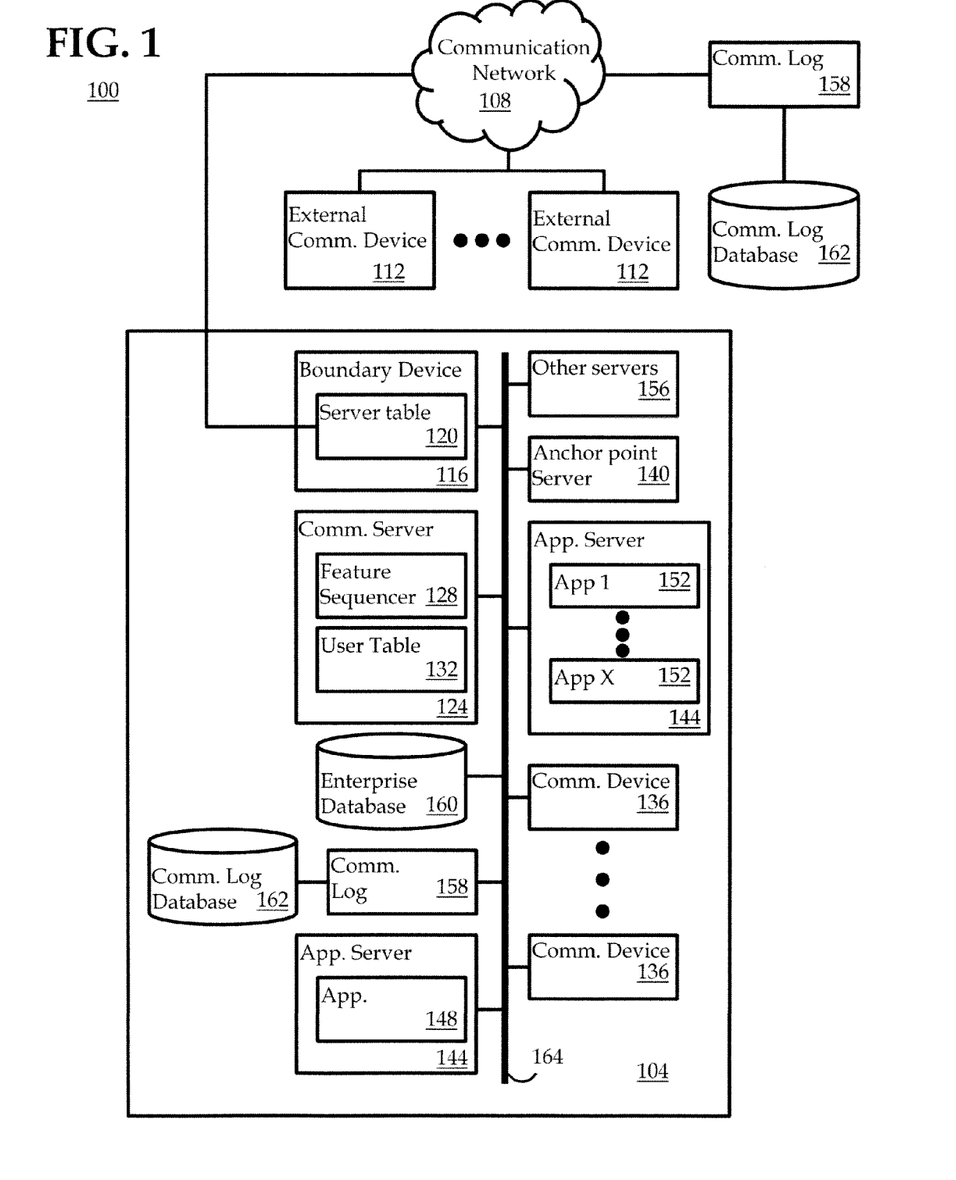
FIG. 1 is a block diagram depicting a communication system in accordance with an embodiment of the present invention.

FIG. 1 depicts a communication system 100 which may be usable with an embodiment of the present disclosure. The communication system 100 may include an enterprise network 104 that is in communication, via a (typically untrusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof. Embodiments herein may refer to communication server 124 generically as a "session manager" for ease of reference.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and services a first subset of enterprise users whereas a second communications server 124 may be authoritative for and services a second subset of enterprise users, where the first and second subsets of users generally do not share a common user. This is one reason why the network boundary device 116 may be provided with a server table 120.

Additionally, multiple servers 124 can support a common user community. For example, in geo-redundant configurations and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but it is not necessarily required that the server be the same. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, the process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

Embodiments in accordance with the present invention provide a novel video metric using facial trajectory analysis, which can be used for real-time detection of end-to-end video frame delays of video conferencing-type applications. Facial trajectory includes recording locations of boxes that encapsulate faces found in a frame, a trajectory recorded as a sequence of x and y coordinates with timestamps. Facial trajectory analysis may exploit certain characteristics of video content in such video conferencing-type applications, i.e., video conferences having few speakers with limited motion.

Embodiments in accordance with the present invention exploit the nature of video conferencing applications. A video conference includes a stream of frames captured by a source side camera, which are sent to a destination to form a received stream of frames. Typically in a video conference there is at least one face in the video. Faces may be detected in a frame of the video, and detected again in at least one more frame of the video. A detected face may be characterized by a bounding box that encloses the detected face. The bounding box is associated with certain characteristics such as its location and size. The location may be, for example, coordinates of one predetermined corner of the bounding box (e.g., the lower left corner) relative to a coordinate system of the video display. The size may be, for example, the width and/or height of the bounding box relative to the coordinate system of the video display. In some embodiments, the size of the bounding box may be constant.

Embodiments in accordance with the present invention will be described in reference to facial detection. However, it should be understood that detection of other moving or movable objects or features that may be available in the video stream may be used to detect video frame delays.

Speakers in a video stream often move their heads and/or faces. For example, a speaker may turn to look around a room, or turn side-to-side to view a teleprompter, or move their mouth and/or jaw while speaking. Therefore, the location and/or size of a bounding box encompassing the speaker's face will change over time. A record of the change in the location and/or size of a bounding box over time is referred to as a trajectory. The trajectory may be a vector quantity that includes both a magnitude (i.e., speed) and a direction of change in the two-dimensional coordinates of a screen display.

Typically, facial detection is performed regularly, such as approximately once per second. The rate that facial detection is performed may depend upon the speed of motion in the video. For example, video of a lecture may utilize a slower rate of facial detection than video of a debate or a musical performance. Movement of one or more detected faces in both the sent video stream and the received video stream may be computed by comparing bounding boxes of the detected faces among video frames of the respective video streams. A similarity between facial trajectories in sent and received video streams is a key property that can be used to infer delay information.

Embodiments in accordance with the present invention rely upon capturing sent and received streams of video frames, the video frames having been time-stamped with respect to a common event such as the signaling of call start at the source and destination, so that facial trajectory measurements are collected at substantially the same time between the sent and received sides. In one embodiment, one or both of the video streams may be obtained from within the video system itself, such as a fork of the media stream. In another embodiment, an external camera in view of a display monitor showing the sent or received video stream may be used to create a separate video stream used for analytic purposes. If one or more external cameras are used, the cameras need not grab an exactly same part of the frames on both the sending and receiving sides, but the size of the captured face with respect to the frame size should be similar between the sending and receiving sides, and the angle of camera placement should be similar. Accordingly, relative timestamps with respect to a common event may be obtained from within the video system as well as by using computers attached to external cameras for frame capture.

In some embodiments, clocks at the transmitting end and the receiving end of the media stream may not be strictly synchronized. Relative clock synchronization between the sent and received sides may be sufficiently provided in a number of ways including using Network Time Protocol ("NTP") or a process based on message exchanges between agents at the sent and received sides, as known in the art. In other embodiments, usage of strictly synchronized timestamps among the transmitting and receiving terminals may improve the analysis by an analytic engine, at least by reducing a frame delay estimation error. In other embodiments, compensating for relative difference in signaling delay to the source and destination may improve the analysis. Relative clock drift may be corrected by periodic recalibrations.

Embodiments in accordance with the present invention rely upon an observation that at least for some types of video media content, the facial trajectories between sent and received video streams should be substantially the same except by an offset in time caused by delays in transporting the video stream from the transmitting end to the receiving end. The offset in time between the sent and received video streams is an estimate of the end-to-end frame delay. The sent and received streams of coordinates of the box locations with relative timestamps form the facial trajectories.

Embodiments in accordance with the present invention utilize techniques to synchronize two streams of box locations with timestamps pertaining to sent and received frames. Within a range of likely synchronization times, embodiments select a time value that tends to minimize a difference in characteristics of bounding boxes (e.g., x and y coordinates, or width and height) of the sent and received video streams across multiple video frames. The selected time value is considered an estimate of the video frame delay.

Facial trajectory analysis is less computationally or resource-usage intensive compared to methods in the background art. Facial trajectory analysis may be usable with a variety of video codecs, and methods in accordance with an embodiment of the present invention are interoperable between different video codecs. For example, suppose a more powerful video codec is used on one end, e.g., a computationally lightweight mobile device is being used to view a conventional video call. Embodiments may provide an intermediate transcoding conversion step from a conference-quality video system to a handheld device or smartphone, in which some changes may be made to the video for the person with the handheld device to view the video. Transcoding may involve changing video parameters, which in turn may add additional delay to the network delay that the video traffic is experiencing.

Since facial trajectory analysis uses decoded frames in the computation, facial trajectory analysis takes into account decoder-specific error concealment capabilities. Facial trajectory analysis relies on detecting the trajectory of the location of a speaker's face in sent and received video frames, as determined by the characteristics of a box that encloses the detected face, and comparing the trajectories to identify end-to-end video frame delays. The box characteristics from the transmitting and/or receiving endpoints may then be transmitted to a predetermined analytic location for processing (e.g., to the transmitting side, to the receiving side, to an intermediate point such as a central server, etc.). An intermediate point may be, e.g., Application 148 in Application Server 144 of FIG. 1. Transmission of box characteristics incurs minimal overhead or burden because of the relatively small amount of data involved compared to the video stream itself. Facial trajectory may be computed at an intermediate server or at one of the endpoints using a stream of the calculated box characteristics and associated timestamps provided by the sending and receiving endpoints.

Detecting the location of the speaker's face in video frames, by a comparator such as a comparator module in a telecommunications endpoint or a comparator application executed by application server 144 of FIG. 1, and calculation of one or more facial trajectories of the detected face, is a process that ordinarily should be completed quickly (i.e., less than a second), and incur small computational overhead. A separate reliable channel such as a TCP/IP channel may be used to transmit the reduced reference features (i.e., box locations that frame identified faces) in-service (i.e., during the teleconference), to the predetermined analytic location.

Another advantage of embodiments in accordance with the present invention is that by applying the embodiments to video conferencing-type applications, face locations in consecutive frames are not likely to change drastically. Therefore a relatively low-grade sampling rate (i.e., less than the full frame rate of the video signal, for instance at three to four frames per second) is sufficient for use by facial trajectory analysis.

Face detection is performed using processes known in the art, producing a bounding box that encapsulates each detected face found in the frame. Face detection techniques are described in U.S. patent application Ser. No. 13/588,637, which is incorporated herein by reference in its entirety.

Various processes may be used for comparing and/or matching trajectories of bounding boxes. For example, a process based upon dynamic time warping may be used to match segments of trajectories in order to produce an estimated delay. However, a standard dynamic time warping process known in the art when applied to trajectories would produce a resolution of one probing interval (e.g., about 350 milliseconds), which is too large when trying to estimate and/or correct for video frame delays. Probing interval in this context refers to the time between two consecutive face location measurements. In other embodiments, comparison of trajectories may include, for example, a correlation calculation between a trajectory over time derived from a transmitted video signal and a trajectory over time derived from a received video signal.

Figure 2:
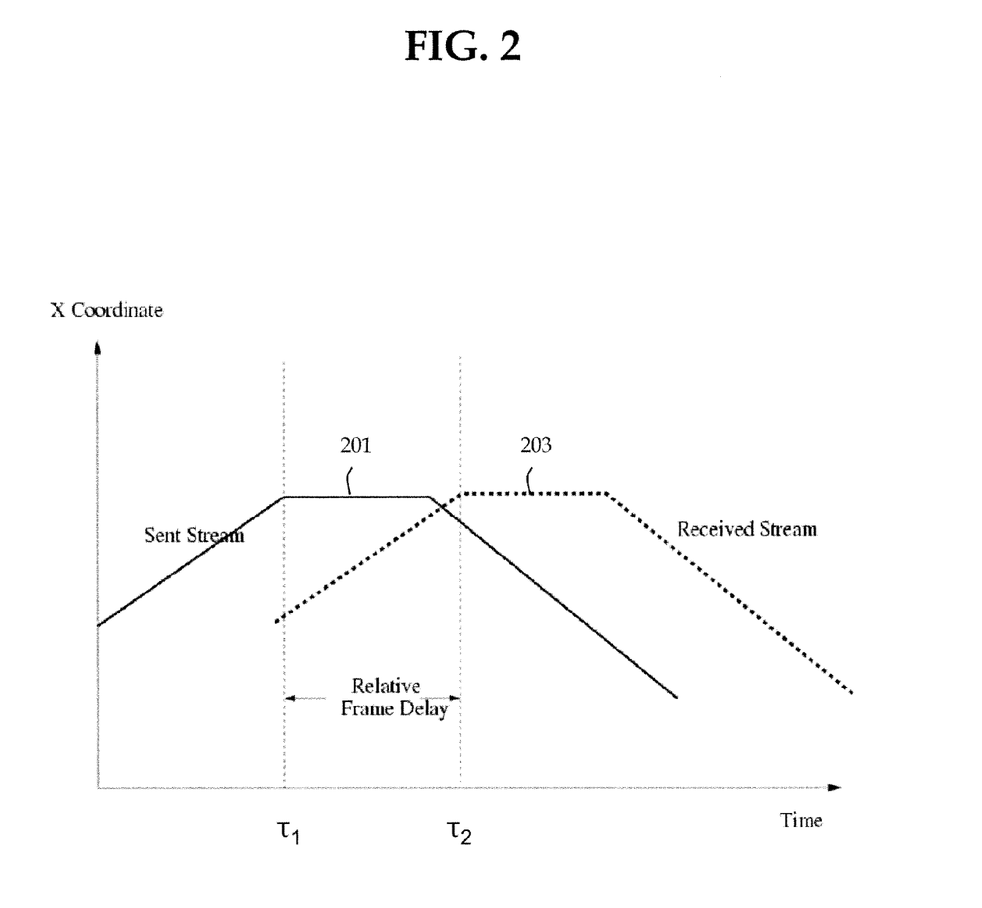
FIG. 2 illustrates trajectory matching in accordance with an embodiment of the present invention.

FIG. 2 illustrates example trajectories of face locations in the x-axis, in sent and received video streams. In this example, we assume there is only one face in the video frames, but a person of ordinary skill in the art will recognize how to extend the scenario of FIG. 2 to a case of multiple faces. In FIG. 2, the x-coordinate as a function of time of a box encapsulating a face in sent stream 201 is shown with solid lines. Similarly, the x-coordinate as a function of time of a box encapsulating a face in received stream 203 is shown with dashed lines. The times reported for the coordinates of both streams are relative times with respect to a common event such as call start time. Not shown in the figure are y-coordinates, which also may be used in the analysis.

In this example, if received stream 203 is plotted with an offset equal to the relative frame delay, then the plot of the received stream 203 would substantially overlap the plot of the sent stream 201. Embodiments in accordance with the present invention may try to find a value for the relative frame delay that tends to minimize the difference between the two plots when so shifted in time.

Embodiments in accordance with the present invention may match the trajectory associated with received stream 203 to the trajectory associated with sent stream 201. For example, a change in velocity in the sent stream 201 may occur at $\tau_1$. A corresponding change in velocity in the received stream 203 may be observed at $\tau_2$. A processing module which receives both the sent stream 201 and received stream 203, and which determines that the event occurring at $\tau_1$ corresponds to the event occurring at $\tau_2$, may then calculate a relative frame delay as being equal to $\tau_2-\tau_1$.

Figure 3:
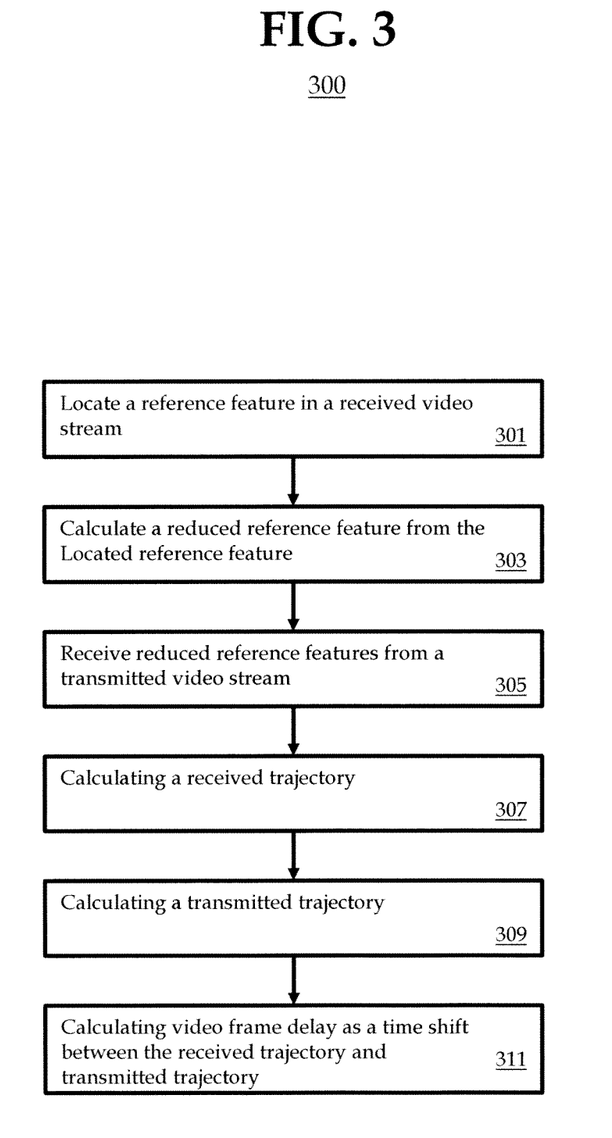
FIG. 3 illustrates a method of calculating video frame delays, in accordance with an embodiment of the present invention.

FIG. 3 illustrates a method 300 in accordance with an embodiment of the present invention. At step 301, reference features that are characteristic of content in the received video stream are located. At step 303, a processor is used to calculate reduced reference features from the located reference features. At step 305, reduced reference features of a transmitted video stream are received, the transmitted video stream corresponding to the received video stream. At step 307, a processor is used to calculate a received trajectory of the reduced reference features from the received video stream. At step 309, a processor is used to calculate a transmitted trajectory of the reduced reference features from the transmitted video stream. At step 311, a processor is used to calculate video frame delay as a time shift between the received trajectory and the transmitted trajectory.

A prototype system has been developed that performs a video capture and face detection process at periodic intervals such as approximately every 350 milliseconds on both the sent side and received side. At longer intervals, e.g., approximately 15 second intervals, trajectories are computed using the intervening face detection results. Ten to fifteen seconds has been found to be a sufficient time interval to obtain an adequate facial trajectory. A matching process is then used to match the received trajectories to the transmitted trajectories and calculate a frame delay during that 15-second interval.

In some circumstances there may be no motion by a speaker during a 15-second interval, during which a delay estimate cannot be unambiguously updated from the estimate during the previous 15-second interval. However, once the speaker performs some detectable motion, such as turning their head or moving their mouth, an event is created in the sent trajectory which is sufficient to match to the received trajectory. If the video is unchanged for a longer period of time, the probability increases that there is a problem or interruption in the video stream which has caused either the sent or received video stream to freeze. Therefore, a secondary benefit of certain embodiments is an ability to detect problems causing frozen video.

If multiple trajectories are detected in a video stream (e.g., multiple faces and/or multiple characteristics derived from a single bounding box), embodiments in accordance with the present invention may estimate the video frame delay by attempting to maximize a total correlation among all trajectories. In some embodiments, characteristics may be given unequal weighting (e.g., bounding box location may be given more weight than bounding box width or height; bounding boxes in the center of the video stream may be given more weight than bounding boxes at the periphery of the video stream, etc.). If the number of faces change, e.g., in a video feed of a panel discussion that switches back and forth between a wide view of the entire panel and a close-up view of a single speaker, embodiments may use frames with either the close-up views or the wide views. In this situation, face size may be used to choose which frames to use.

Embodiments in accordance with the present invention match faces found in received frames to faces found in sent frames, by selecting pairs of coordinates with minimum distances between them. Face detection software, due to inherent limitations of known processes, may find more or fewer faces than are actually present in the video. If the number of speakers is known to be k, then up to k such distance values are selected pertaining to each face found in the frame. In cases where a face is not detected in a sent frame, a trajectory may be interrupted.

Figure 4:
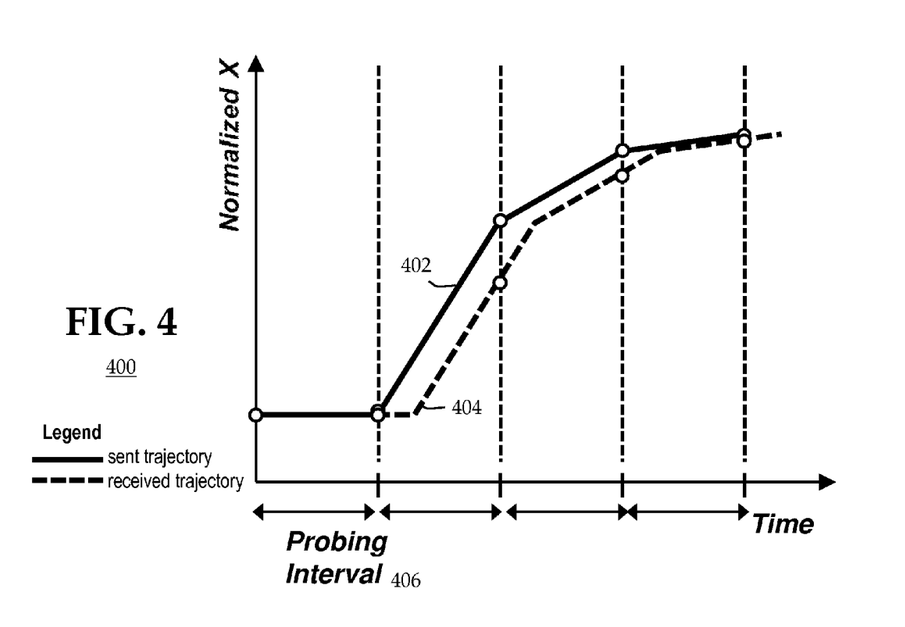
FIG. 4 illustrates a graphical depiction of frame delay estimation in accordance with an embodiment of the present invention.

FIG. 4 illustrates an exemplary graphical depiction 400 of a sent trajectory 402 and a received trajectory 404 of an example video stream. The x-axis represents time, and the y-axis represents normalized position in a predetermined coordinate. As illustrated, the coordinate is the "X" (i.e., horizontal) direction, but could also be the "Y" (i.e., vertical) direction, or a function of one or both (e.g., Euclidean distance SQRT($X^2+Y^2$)). The frame delay estimation process may include multiple instances of graphical depiction 400, each depicting a trajectory of a different metric (e.g., separate trajectories in the x-axis and y-axis). Normalization substantially compensates for differences in screen size and resolution between the sending and receiving sides. The y-axis may also represent other metrics such as bounding box width and/or height. Trajectory 402 represents the normalized position or metric at one side of the media stream (e.g., the sending side) and trajectory 404 represents the normalized position or metric at the other side of the media stream (e.g., the receiving side).

The prototype relies on a sample of the frames that are selected at periodic intervals at both the sending and receiving sides and processed to find face locations. Probing interval refers to the time between two consecutive face location measurements at the sending or the receiving side. The x-axis of depiction 400 shows probing intervals 406 and the resulting face location measurements extracted from selected frames as filled circles at both the sending and receiving sides. Note that during periodic sampling at the sending and receiving sides, different frames will be selected. Hence the trajectories extracted at the sending and receiving sides will not be identical but similar. Facial trajectories may be extracted from the sent and received media streams, and facial trajectories or other features so extracted from the sent and received media streams may be time-stamped with respect to an event that is common to both the sent and received media streams (e.g., a movement, a change in camera shot, etc.).

Figure 5:
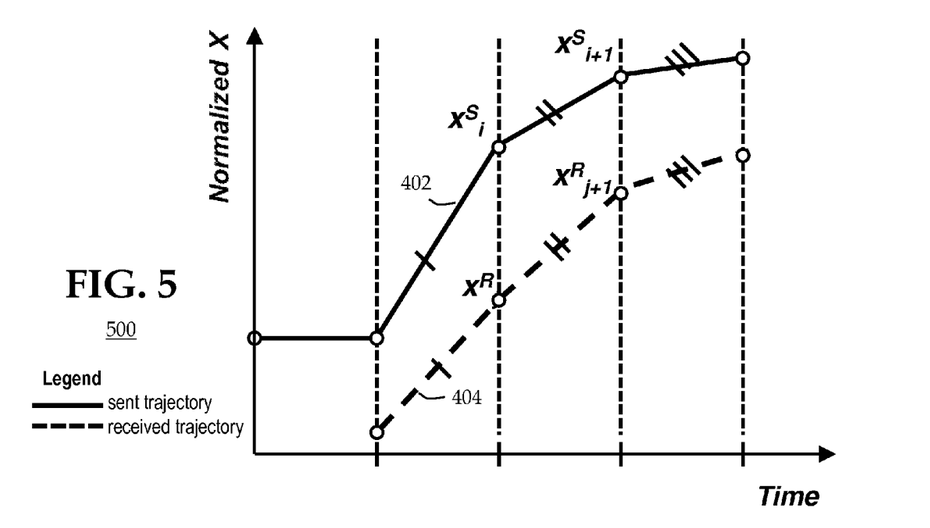
FIG. 5 illustrates a graphical depiction of a frame delay estimation technique in accordance with an embodiment of the present invention.

FIG. 5 graphically illustrates a frame delay estimation process 500 in accordance with an embodiment of the present invention. Process 500 may begin when "N" metrics such as bounding box coordinates have been detected from the transmitted video feed, along with associated timestamps. Furthermore, assume that "M" metrics have been detected from the received video feed, along with associated timestamps. Ordinarily M=N, but they may not be necessarily equal when the video is noisy or the video includes a cutaway to a different scene, perspective, or so forth. Let the transmitted metrics be represented as a set of 3-tuple vectors ($X^S_i$, $Y^S_i$, $T^S_i$) for 1≤i≤N, and let the received metrics be represented as a set of 3-tuple vectors ($X^R_j$, $Y^R_j$, $T^R_j$) for 1≤j≤M.

Video frame delay estimation may be calculated from trajectories 502 and 504 by a processor of system 100. In particular, the frame delay estimation may be calculated by usage of curve-matching processes such as a dynamic time warping ("DTW") process known in the art. The frame estimation may be produced at time intervals that are sufficiently frequent with respect to variations in the sources of video frame delays. For such purposes, once every 15-30 seconds may be considered sufficiently real-time.

Figure 6:
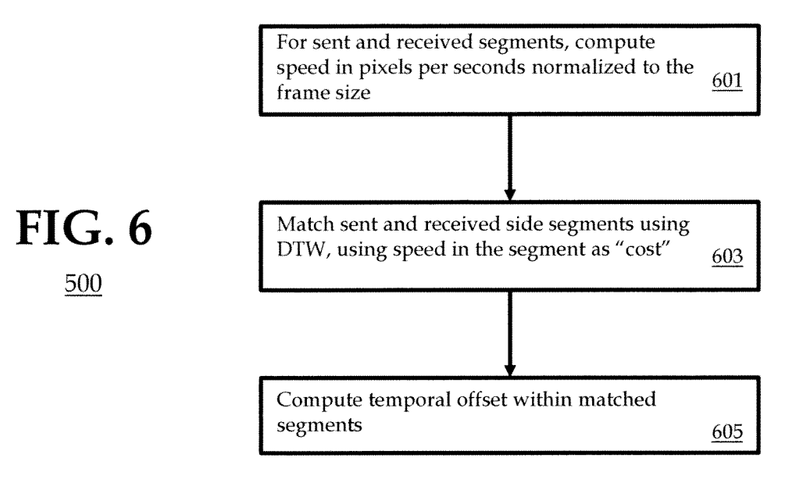
FIG. 6 illustrates a flow chart of a frame delay estimation process in accordance with an embodiment of the present invention.

Process 500 is illustrated in further detail in FIG. 6. Process 500 begins at step 601, during which, for sent and received segments, a processor such as server 144 computes speed in pixels per seconds normalized to the frame size. A segment in this context refers to the part of a trajectory between two consecutive face detection measurements.

Process 500 transitions to step 603, at which a processor such as server 144 matches sent-side and received-side segments. A process such as DTW may be used in the matching, using trajectory speed in the segment as a "cost" for purposes of computing DTW.

Process 500 transitions to step 605, at which a processor such as server 144 computes temporal offset within matched segments.

Figure 7:
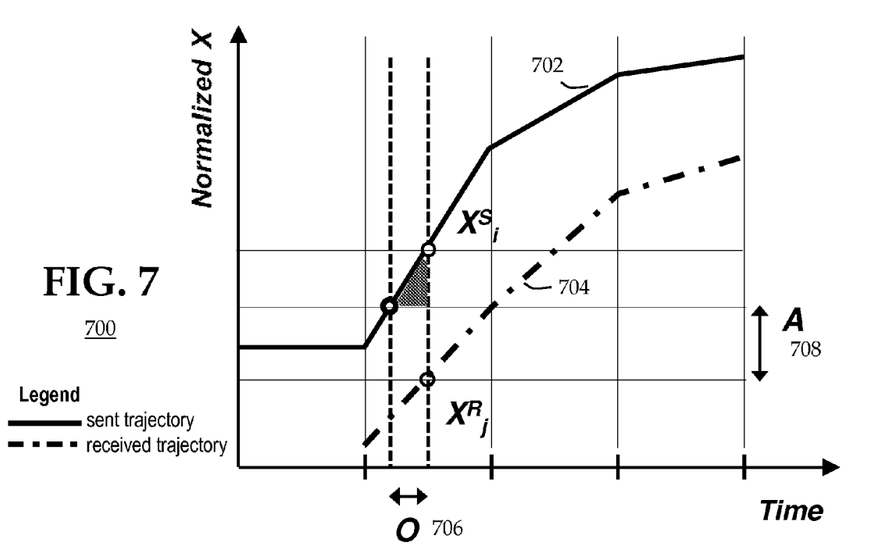
FIG. 7 illustrates a graphical depiction of a temporal offset computation technique in accordance with an embodiment of the present invention.

FIG. 7 graphically illustrates a temporal offset computation process 700 in accordance with an embodiment of the present invention. Process 700 as illustrated assumes a temporal offset 706 (denoted as "O") and a spatial offset 708 (denoted as "A").

Figure 8:
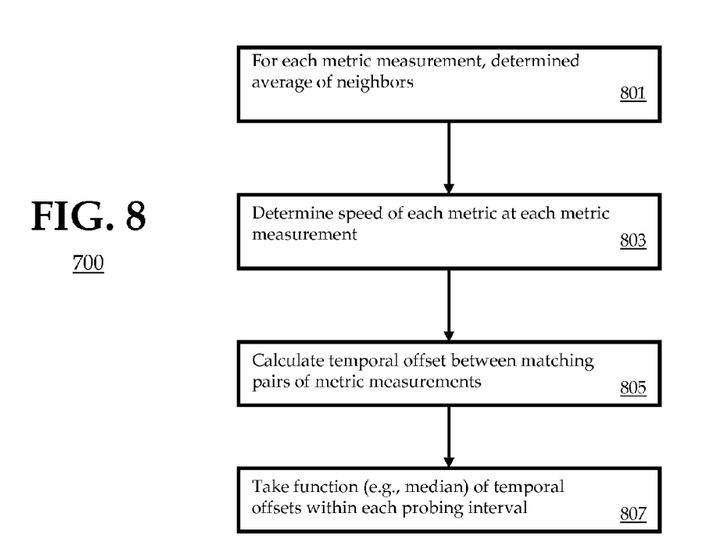
FIG. 8 illustrates a flow chart of a temporal offset computation process in accordance with an embodiment of the present invention.

Process 700 is illustrated in further detail in FIG. 8. Process 700 begins at step 801, during which, for each pair of sent and received segments matched by the DTW algorithm, a smoothing function such as an average of adjacent face location measurements may be made. For example, smoothing calculations may be carried out in accordance with Equations (1) and (2) for the sending and receiving sides, respectively:

$$X^S_i = \left(\frac{x^S_i + x^S_{i+1}}{2}\right) \quad (1)$$

$$X^R_j = \left(\frac{x^R_j + x^R_{j+1}}{2}\right) \quad (2)$$

Process 700 then transitions to step 803, at which the temporal offset is determined for each pair of sent and received segments matched by the DTW algorithm. Assuming the temporal offset and the spatial offset do not substantially change within a short time period over which the frame delay metric is estimated, temporal offset for a pair of matched segments may be calculated in accordance with Equation (3) where $v_i$ is the reference facial speed at the ith matched segment:

$$O = \left(\frac{X^S_j - X^R_i - A}{v_i}\right) \quad (3)$$

Process 700 then transitions to step 805 where the overall temporal offset may be calculated as, for example, a median or a mean of all temporal offsets computed for each matched pair of segments. Other statistical measures known in the art may also be used.

Embodiments in accordance with the present invention may employ various patterns for selecting frames periodically from a video stream and processing them for face locations. One example pattern is to select a frame at equal probing intervals such as one frame every 350 ms. Alternatively, a probing pattern may alternate between a short probing interval (such as selecting a frame in the next 350 ms.) and a long probing interval (such as selecting a frame in the next 500 ms.). The goal of the probing pattern is to sample only a few of the frames in such a way that the sent and received trajectories extracted using these few frames closely resemble those trajectories that would be extracted if all the frames were used.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method to calculate video frame delay in a video stream received by a telecommunications endpoint, the method comprising:
   locating reference features that are characteristic of content in the received video stream;
   calculating, by use of a processor, reduced reference features from the located reference features;
   receiving reduced reference features of a transmitted video stream, the transmitted video stream corresponding to the received video stream;
   calculating, by use of a processor, a received trajectory of the reduced reference features from the received video stream;
   calculating, by use of a processor, a transmitted trajectory of the reduced reference features from the transmitted video stream; and
   calculating, by use of a processor, video frame delay as a time shift between the received trajectory and the transmitted trajectory.

2. The method of claim 1, wherein the reference features that are characteristic of content comprise faces.

3. The method of claim 1, wherein the reduced reference features comprise locations of the reference features.

4. The method of claim 1, wherein the reduced reference features comprise a location of rectangular areas surrounding the reference features.

5. The method of claim 1, wherein the reduced reference features are calculated at less than a full frame rate of the received video stream.

6. The method of claim 1, wherein the reduced reference features are calculated at no more than five frames per second.

7. The method of claim 1, wherein the reduced reference features of the transmitted video stream are received via a communication channel that is separate from a communication channel used to transport the video stream.

8. The method of claim 1, further comprising:
   receiving a frame of the transmitted video stream to the telecommunications endpoint, once per second, via a reliable channel; and
   calculating reduced reference features from the frame.

9. The method of claim 1, wherein the video stream originates from a remotely-located camera accessible via a communication path.

10. The method of claim 1, further comprising:
    detecting an absence of reference features from the received video stream.

11. A system to calculate video frame delay in a video stream received by a telecommunications endpoint, the system comprising:
    a computer-readable storage medium, storing executable instructions; and
    a plurality of processors coupled to the computer-readable storage medium, the processors, when executing the executable instructions:
      locate reference features that are characteristic of content in the received video stream;
      calculate reduced reference features from the located reference features;
      receive reduced reference features of a transmitted video stream, the transmitted video stream corresponding to the received video stream;
      calculate a distance between the reduced reference features in the received video stream and the reduced reference features of the transmitted video stream;
      calculate a received trajectory of the reduced reference features from the received video stream;
      calculate a transmitted trajectory of the reduced reference features from the transmitted video stream; and
      calculate video frame delay as a time shift between the received trajectory and the transmitted trajectory.

12. The system of claim 11, wherein the reference features that are characteristic of content comprise faces.

13. The system of claim 11, wherein the reduced reference features comprise a location of rectangular areas surrounding the reference features.

14. The system of claim 11, wherein the reduced reference features are calculated at less than a full frame rate of the received video stream.

15. The system of claim 11, wherein the reduced reference features are calculated at no more than five frames per second.

16. The system of claim 11, wherein the reduced reference features of the transmitted video stream are received via a communication channel that is separate from a communication channel used to transport the video stream.

17. The system of claim 11, wherein the video stream originates from a remotely-located camera accessible via a communication path.

18. The system of claim 11, wherein the processors, when executing the executable instructions:
    detect an absence of reference features from the received video stream.

* * * * *